UNITED STATES PATENT OFFICE.

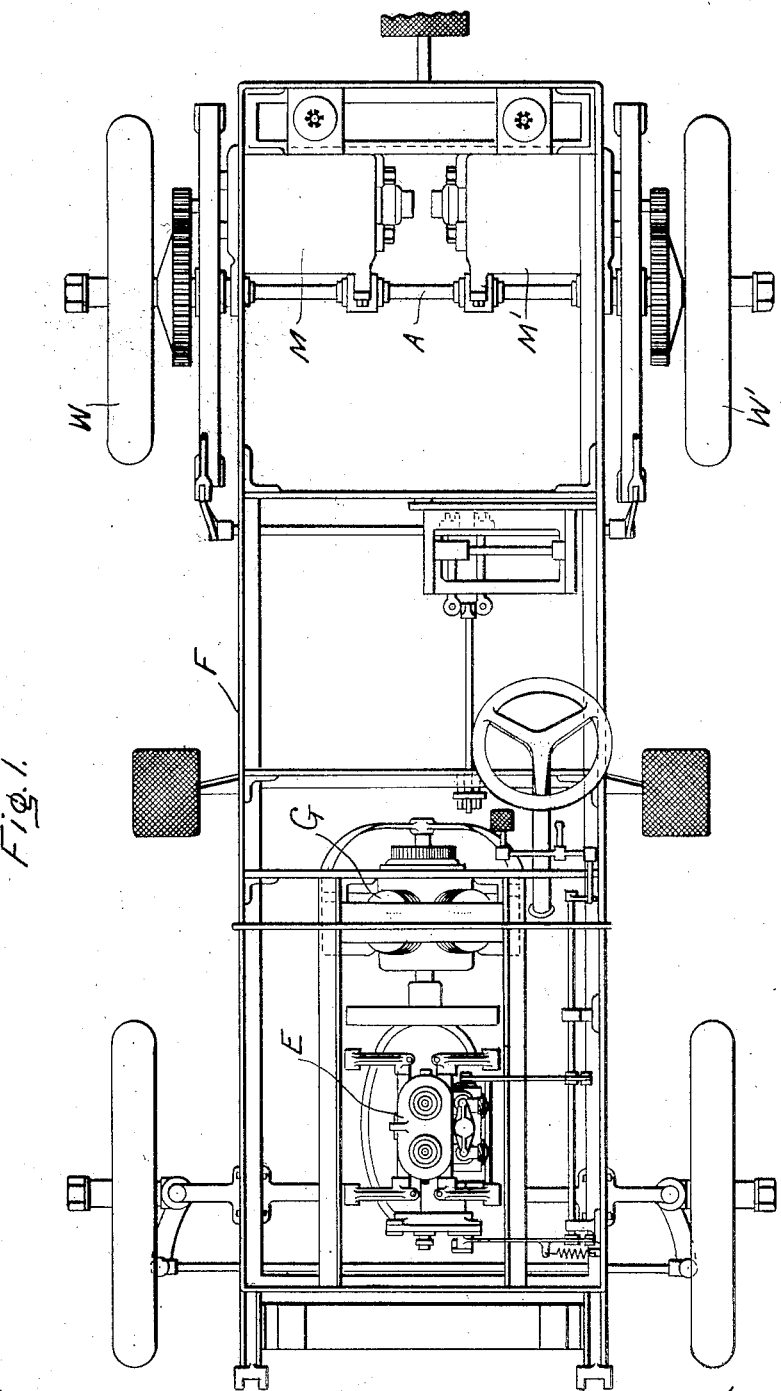

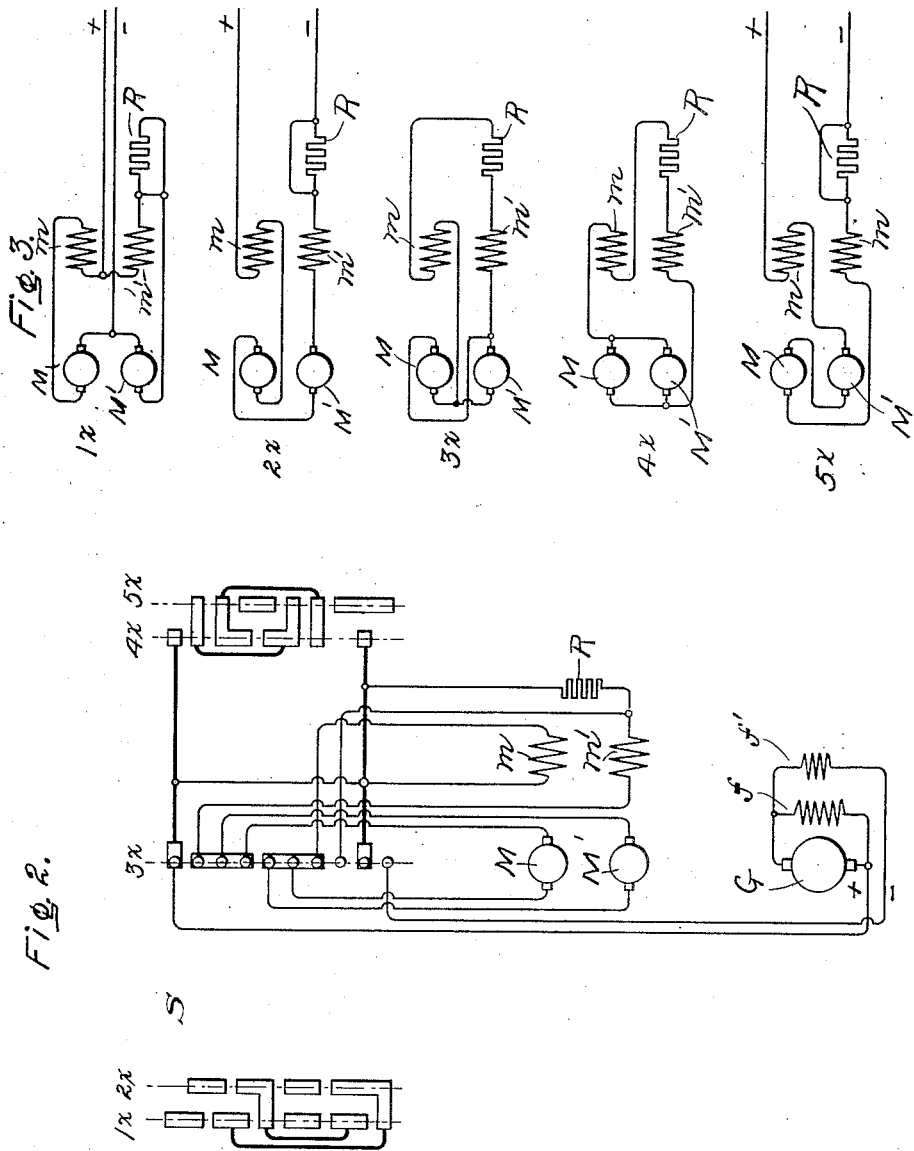

HERMANN LEMP, OF LYNN, MASSACHUSETTS, ASSIGNOR TO GENERAL ELECTRIC COMPANY, A CORPORATION OF NEW YORK.

AUTOMOBILE CONTROL.

No. 852,728. Specification of Letters Patent. Patented May 7, 1907.

Application filed October 11, 1905. Serial No. 282,238.

*To all whom it may concern:*

Be it known that I, HERMANN LEMP, a citizen of the United States, residing at Lynn, county of Essex, State of Massachusetts, have invented certain new and useful Improvements in Automobile Control, of which the following is a specification.

My invention relates to the control of automobiles of the type in which the driving-wheels are independently rotatable and are driven by independent series-wound electric motors; and the object of my invention is to provide novel connections for electrically braking the vehicle in such a manner as to prevent skidding.

It has been proposed heretofore to brake vehicles driven by series-wound electric motors by short-circuiting the motors through a resistance with the connections of field and armature relatively reversed. This method of braking with the connections heretofore employed tends to produce skidding when applied to a vehicle with independently rotatable driving-wheels on opposite sides thereof. If the motors are connected in series, the currents flowing through the fields and armatures of both motors are at all times equal, so that the torques of both motors are equal without regard to their relative speeds. Consequently, if one driving-wheel is passing over a slippery spot in the road, skidding of that wheel may be produced. On the other hand, if the motors are connected in parallel, and short-circuited through a resistance, the currents through the two motors are not necessarily the same, so that their speeds and torques may be unequal, and an inequality in field strength of the motors, arising from any cause, will be in itself a source of skidding.

My invention consists in arranging the controlling switch to short-circuit the motors through a resistance with their fields in series and with their armatures in parallel. With this connection the same current must always flow through both fields, so that the field-strength of the two motors are maintained equal, and since the armatures are connected in parallel, any difference in their speeds, such as would arise from a tendency of one wheel to slip, will produce a difference in the electromotive forces induced in the armatures. The inequality in the electromotive forces in the two armatures will tend to cause current to flow in the short-circuit formed by the two armatures, and this current will tend to bring the motors back to the same speed, thus automatically compensating for the skidding tendency. In short, with this connection the motors are inherently self-regulating and maintain the driving wheels at equal speeds.

My invention accordingly consists in the combination in a vehicle having independently rotatable driving-wheels on its opposite sides and series-wound electric motors mechanically connected thereto, of a resistance and a controlling switch adapted to short-circuit the motors through the resistance with their fields in series and their armatures in parallel.

My invention will best be understood by reference to the accompanying drawings, in which Fig. 1 shows a plan view, with the car body removed, of an automobile adapted to be controlled in accordance with my invention; Fig. 2 is a diagram of the connections of the controlling switch; and Fig. 3 is a diagram of the motor connections produced by the controlling switch of Fig. 2.

In the drawings, G represents a source of electric current, such as a generator driven by an engine E and supported on the frame F of the vehicle.

W and W' represent the driving-wheels of the vehicle, which are independently sleeved on the rear axle A in the usual manner, so as to be independently rotatable.

M and M' represent two series-wound electric motors, each of which is connected mechanically to one of the driving-wheels through suitable gearing.

In Fig. 2 the generator is shown as a compound-wound machine having a shunt field $f$ and a series field $f'$. I prefer to employ a compound-wound generator, since it permits of control over wide ranges by varying the speed of the prime mover, as a compound-wound generator will operate over wide ranges of speed and widely varying load without losing its excitation. In Fig. 2 the fields of the motors M and M' are represented by the letters $m$ and $m'$, respectively. R represents a resistance through which the motors are short-circuited for braking. S represents a controlling switch which is adapted to connect the motors to the generator for running and to the resistance for braking, and which is shown as having five positions indicated by the dotted lines $1^\times$ to $5^\times$, respectively. The circuit connections of the motors are shown in the diagrams of Fig. 3, each diagram being provided with a reference character corresponding to the position of the controlling switch S of Fig. 2, which produces the connections shown in the diagram. Thus, in the position $1^\times$ of switch S it will be seen that the motors are connected to the generator in parallel as shown in diagram $1^\times$ of Fig. 3. This is the high-speed forward running position. In the position $2^\times$ of switch S the motors are connected in series, as shown in diagram $2^\times$ of Fig. 3. This is the low-speed forward running position. Position $3^\times$ is the coasting position for forward running and the braking position for backward running. In this position of the controlling switch the generator is open-circuited and the motors are short-circuited through a resistance R, the fields being in series and the armatures being in parallel.

It will be noted that the relative connections of the field and armature of each motor are the same as in diagrams $1^\times$ and $2^\times$, so that no braking effect is produced for forward running. Position $4^\times$ is the position for braking for forward running. As in position $3^\times$, the motors are short-circuited through the resistance R with the fields in series and the armatures in parallel, but the relative connections of the field and armature of each motor are reversed with respect to the connections of position $3^\times$. In position $5^\times$ the motors are connected in series to the generator, but with fields and armatures relatively reversed with respect to position $2^\times$. This is the position for backward running.

With the braking connections shown, the field strengths of both motors are at all times equal, and since the armatures are connected in parallel so that the two armatures form a short-circuit for each other, any difference in induced electromotive force, due to one armature running at a higher speed than the other, will strengthen the current in the armature running at the higher speed and weaken the current in the armature running at the lower speed,—that is, the torque on the former motor will be increased and that on the latter motor decreased, so as automatically to bring the motors back to the same speed, and in this manner the tendency to skid is automatically compensated for, since the motors, and consequently the driving-wheels, are kept running at the same speed.

What I claim as new, and desire to secure by Letters Patent of the United States, is,—

1. In an electrically-driven vehicle, independently rotatable driving-wheels on opposite sides of the vehicle, series-wound electric motors mechanically connected to said wheels, a resistance, and a controlling switch adapted to connect the motors in short-circuit through said resistance, and with the motor fields in series and armatures in parallel.

2. In an electrically-driven vehicle, independently rotatable driving-wheels on opposite sides of the vehicle, series-wound electric motors mechanically connected to said wheels, a resistance, and a controlling switch adapted to connect the motors to a source of current in series and in parallel for different speeds and to short-circuit the motors through said resistance for braking with the motor fields in series and armatures in parallel.

3. In an electrically-driven vehicle, independently rotatable driving-wheels on opposite sides of the vehicle, series-wound electric motors mechanically connected to said wheels, a source of current for said motors carried by the vehicle, a resistance, and a controlling switch adapted to connect the motors in series and in parallel to said source and to short-circuit the motors through said resistance with the motor fields in series and armatures in parallel.

In witness whereof, I have hereunto set my hand this sixth day of October, 1905.

HERMANN LEMP.

Witnesses:
JOHN A. McMANUS, Jr.,
HENRY O. WESTENDARP.